(12) United States Patent
Vannieuwenhoven

(10) Patent No.: US 9,675,057 B2
(45) Date of Patent: Jun. 13, 2017

(54) SELF-PIVOTING FISHING ROD HOLDER

(71) Applicant: Justin Vannieuwenhoven, Sheboygan, WI (US)

(72) Inventor: Justin Vannieuwenhoven, Sheboygan, WI (US)

( * ) Notice: Subject to any disclaimer, the term of this patent is extended or adjusted under 35 U.S.C. 154(b) by 4 days.

(21) Appl. No.: 14/143,393

(22) Filed: Dec. 30, 2013

(65) Prior Publication Data
US 2015/0181854 A1 Jul. 2, 2015
US 2016/0150770 A9 Jun. 2, 2016

Related U.S. Application Data

(60) Provisional application No. 61/746,767, filed on Dec. 28, 2012.

(51) Int. Cl.
*A01K 97/10* (2006.01)
(52) U.S. Cl.
CPC .................. *A01K 97/10* (2013.01)
(58) Field of Classification Search
CPC ............... A01K 97/10; A01K 97/11

USPC .............. 43/21.2, 17, 22; 248/415, 520, 521
See application file for complete search history.

(56) References Cited

U.S. PATENT DOCUMENTS

| | | | |
|---|---|---|---|
| 2,995,855 A * | 8/1961 | Bell | 43/21.2 |
| 4,731,947 A * | 3/1988 | Hart et al. | 43/21.2 |
| 4,852,290 A * | 8/1989 | Wallace et al. | 43/17 |
| 2006/0248778 A1* | 11/2006 | Ward et al. | 43/19.2 |
| 2007/0089350 A1* | 4/2007 | Elliott | A01K 91/08 43/15 |
| 2007/0220800 A1* | 9/2007 | Baez | A01K 91/08 43/27.4 |
| 2008/0134565 A1* | 6/2008 | Sutherland et al. | 43/21.2 |
| 2009/0084019 A1* | 4/2009 | Carnevali | A01K 97/10 43/21.2 |
| 2011/0083355 A1* | 4/2011 | Wilcox | A01K 91/08 43/27.4 |
| 2011/0225870 A1* | 9/2011 | Carnevali | 43/21.2 |
| 2013/0255130 A1* | 10/2013 | Baugh | 43/4.5 |

* cited by examiner

*Primary Examiner* — William Gilbert
(74) *Attorney, Agent, or Firm* — Andrus Intellectual Property Law, LLP

(57) ABSTRACT

Disclosed is a fishing rod holder that permits the fishing rod to pivot itself, so that the bait can stay relatively stable in the water when fishing.

10 Claims, 9 Drawing Sheets

SELF-PIVOTING FISHING ROD HOLDER

This application claims benefit of U.S. Provisional Pat. Application, Ser. No. 61/746,767, filed Dec. 28, 2012, which is hereby incorporated in its entirety herein by reference.

FIELD

This invention is generally related to a fishing rod holder, and a jigging apparatus and hook setting and rod holder and removal technique.

BACKGROUND OF THE INVENTION

There are multiple types of fishing rod holders available. However, it is difficult to remove the fishing rod from these holders because usually the fishing rod is somehow fixed into the holder to prevent it from gliding away. These fishing rod holders also do not allow the user to set the hook in a quick manner. Another problem is that these fishing rod holders require the user to reach over water to operate the pole, which brings substantial risk to the user to fall overboard. The biggest problem though is that typically these fishing rod holders hold the fishing rod in a permanent position. The best they can do is to let the user set the fishing rod in only two or more limited positions. What is needed, are improved fishing rod holders.

SUMMARY OF THE INVENTION

The present invention overcomes all the problems discussed in the Background, and allows free pivoting of fish rod. By pivoting with the fishing rod, the bait stays in a relative stable height within the water, which results in a potentially higher fish catch rate.

Accordingly, in some embodiments, provide herein is a fishing rod holder for mounting to a boat or placement onto an ice house or other object.

In some embodiments, provided herein is a fishing rod holder that prevents the rod and reel from falling out of the holder due to high tension or obstructions in the water. In addition, in some embodiments, provided herein is a fishing rod holder that keeps the rod and reel along with the user inside the boat at all times.

In some embodiments, provide herein is a fishing rod holder that permits easy removal of the rod and quick setting of the hook without the risk of reaching over water, thus resulting in no time delay to set the hook.

In some embodiments, provided herein is a fishing rod holder that pivots the fishing rod freely, allowing the bait to stay in a relative stable height in the water, in order to create a consistent natural look for the bait.

In some embodiments, provided herein is a fishing rod holder that provides zero line resistance on the ice to create a consistent natural feel for the bait.

In some embodiments, provided herein is a fishing rod holder that is usable at multiple angles for trolling, casting a bait, or anything in between.

Further areas of applicability of the present invention will become apparent from the detailed description provided hereinafter. It should be understood that the detailed description and specific examples, while discussing preferred embodiments of the invention, are intended for purposes of illustration only and are not intended to limit the scope of the invention The present invention provides a self-pivoting fishing rod holder for use in, for example, ice fishing or boat fishing settings. In some embodiments, the fishing rod holder comprises a support member and a tubular holster with multiple pivot holes.

In some embodiments, the fishing rod holder comprises a tubular holster and a support member. A fishing rod is inserted into the tubular holster. The tubular holster has multiple pivot holes to allow the fishing rod holder to be used for different fishing conditions, including but not limited to both boat fishing and ice fishing. In some embodiments, the front pivot hole of the tubular holster is positioned to be ideal for boat fishing, and the rear pivot hole is positioned to be ideal for ice fishing. In some embodiments, the tubular holster also has multiple cutout slots to allow differing placements of the rod and reel. The tubular holster sits on a support member. The support member can either lock the tubular holster by tightening a knob, or allow the tubular holster along with the fishing rod to pivot itself. In some embodiments, a base is attached to the support member such that the base mounts the fishing rod holder to a boat or other appropriate objects. Sinkers can be added to the rod, holder, or fishing line to better balance the pole and the holder.

In some embodiments, the support member is Y-shaped. In some embodiments, there is a hole through the top of the support member acting as a pivot point, and on one side of the support member at the top there is a locking star design, which is used to attach the tubular holster to the support member. The support member can be mounted on various bases by inserting various types of fasters into the cut out at the bottom of the support member. The support member can be bent so that the top branch section and the lower straight portion of its Y shape forms an angle which is less than 180 degrees. In some embodiments, near the bend in the lower portion there are different diameters and a multi-point star design, which makes it easy to set the support member at various angles and eliminates slippage under tension.

In some embodiments, the tubular holster has at least two pairs of holes and circular faces. On a first side is the first pair of holes. For the first pair of holes, ideally, on only one side there is a star design. This pair of holes is intended for boat fishing use. On a second side of the tubular holster is the second pair of holes, which does not have any star design and is intended for ice fishing use, especially for tip down ice fishing.

In some embodiments, there is a cutout on the first side of the tubular holster, so that a fishing pole may rest in this cut out if the user chooses. This allows the rod holder to be used in trolling type fishing. In some embodiments, there are three notches on the second side of the tubular holster that allows an ice fishing reel for ice fishing to rest in one of the three notches. There are three cutouts because an ice fishing pole is typically shorter than a regular boat fishing pole, thus three cutouts provides the user more options to rest the fishing reel.

In some embodiments, there is also a cut out on the second side of the tubular holster, and a fishing reel for boat fishing can rest in this cut out. The designs for resting fishing reel ensures that the fishing pole cannot escape easily from the fishing rod holder. Furthermore, by using this device, a user no longer needs to reach over water to maneuver the fishing pole. The user can set the hook quicker by just pushing the back of the pole and the front pivots upwards to raise the hook out of water.

In some embodiments, the support member and the tubular holster are connected by utilizing the hole on top of the support member, the pivot holes on the tubular holster and a knob. A locking knob is inserted into the chosen pivot hole to clasp the support member and the tubular together. When the user tightens the knob, it causes the star design on the holes of the support member and the star design on the chosen pivot holes of the tubular holster to match and press against each other, and thus results in minimum relative movement of the support member and the tubular. When the user loosens the knob, it causes the star designs on the support member and the tubular holster to separate from each other, and thus allows free pivoting of the tubular holster on the support member.

By allowing the fishing pole to freely and continuously pivot itself, the bait is not forced to follow the movement of the boat and can stay in a relative stable height in the water even in tough wave conditions. This can, for example, result in a better fish catch rate in bad weather days. Moreover, even when the tubular holster is locked into the support member by tightening the locking knob, the fishing pole can still be set in different fixed horizontal angles easily by the user by manipulating the relative angles of the tubular holster and the support member.

A user may also choose to add extra sinkers or weights to the fishing line, holder, or fishing rod to balance the fishing pole better so that the fishing pole stays in a relative stable horizontal position.

DETAILED DESCRIPTION OF THE DRAWINGS

The following description of certain embodiments is merely exemplary in nature and is in no way intended to limit the invention, its application, or uses.

Figure 1:
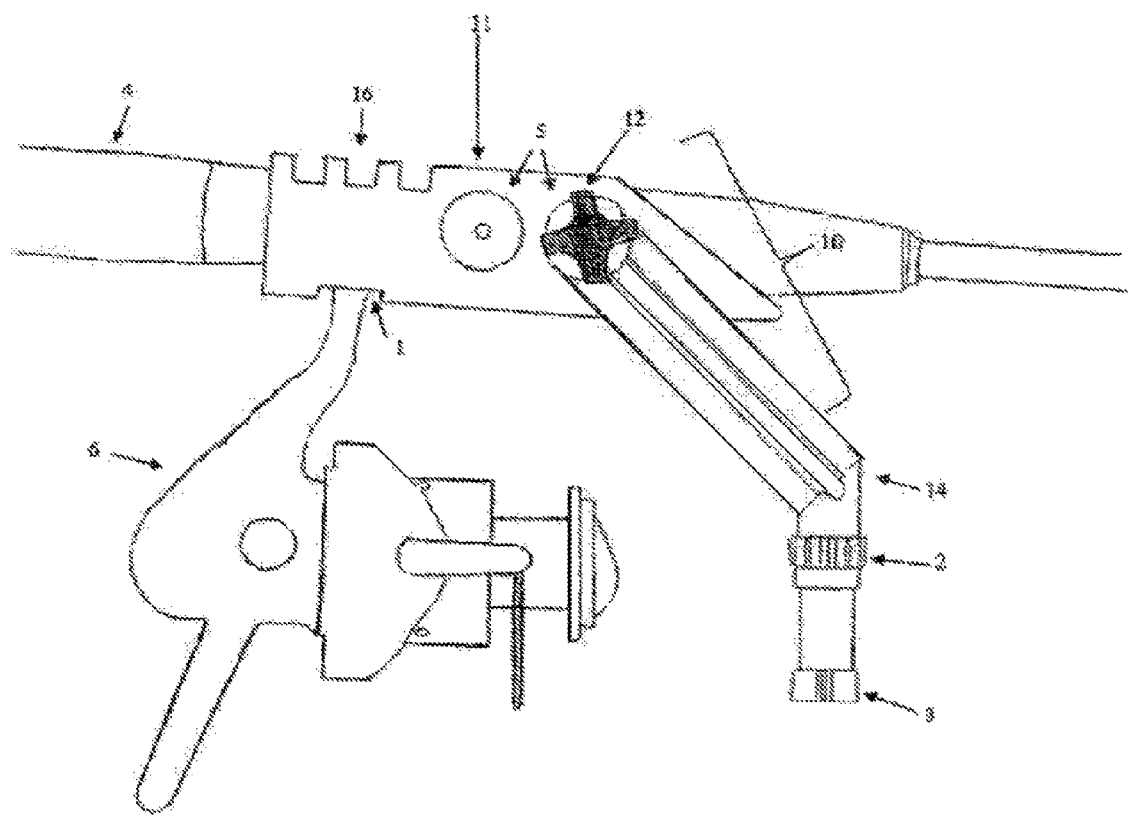
FIG. 1 is a side view of one embodiment of the fishing rod holder device, and an exemplary fishing rod when the fishing rod holder device is used in the fixed position setting.
Figure 2A:
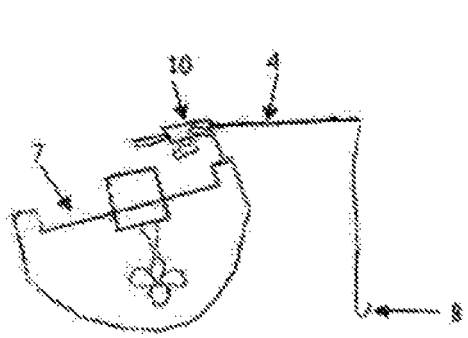
FIGS. 2A-2D is a perspective view of one embodiment of the fishing rod holder device, an exemplary boat, and an exemplary fishing pole comparing to an existing standard fishing rod holder, an exemplary boat, and an exemplary fishing pole in two water wave conditions.
Figure 2B:
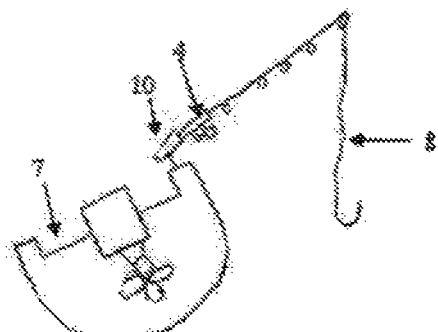
Figure 2C:
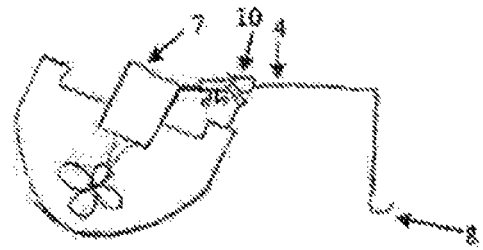
Figure 2D:
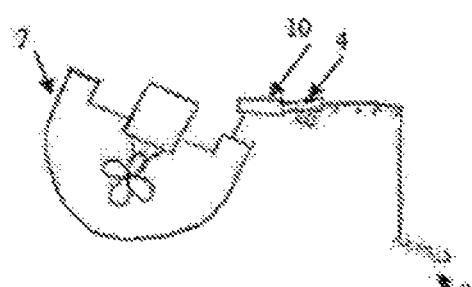
Figure 3A:
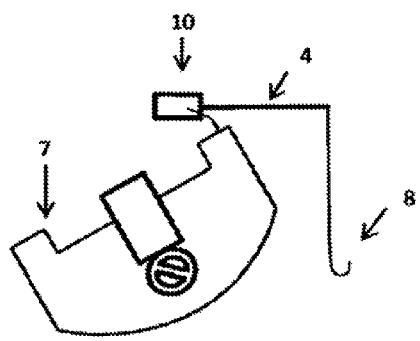
FIGS. 3A-3D is a perspective view of the embodiment depicted in FIGS. 2A-2D.
Figure 3B:
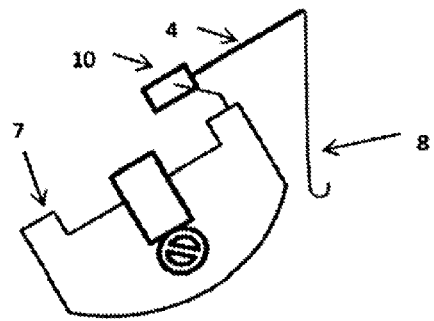
Figure 3C:
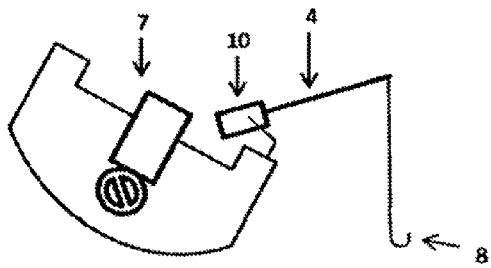
Figure 3D:
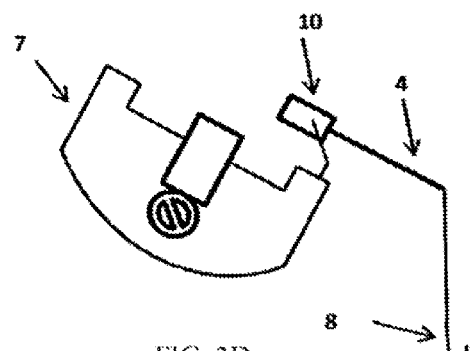

The some embodiments (see FIGS. 1-9), the fishing rod holder 10 is comprised of a yoke 14, a rod holder 11 (made, e.g., using plastic or other appropriate materials), a locking knob 12, and a mounting base 15 or 18. A fishing rod 4 is inserted into the fishing rod holder to demonstrate its use. When used for fishing on a watercraft, the rod holder 10 is fixed to the mounting base 15 which is fixed to the angler's watercraft. When used for fishing on the ice the rod holder 10 is fixed to the mounting base 18, which is placed on the ice or fixed to the mounting base 15, which is fixed to an article (e.g., bucket, sled, ice shack, or other mountable surface). The fishing rod holder 10 has a locking knob 12 to connect the yoke 14 and the rod holder 11. The rod holder also have multiple pivot holes 5. Moreover, the fishing rod holder 10 has three notches 16 and one cutout 1. In FIG. 1, the fishing rod is resting in the cutout 1. The yoke 14 has diameters 2 at the middle of yoke and multi-point star design 3 at the bottom, which are compatible with some commonly used bases in the market.

The fishing rod holder 10 may be used (in FIG. 1) in a "fixed position", a continuous pivoting position, and ice fishing zero line resistance position.

Figure 6:
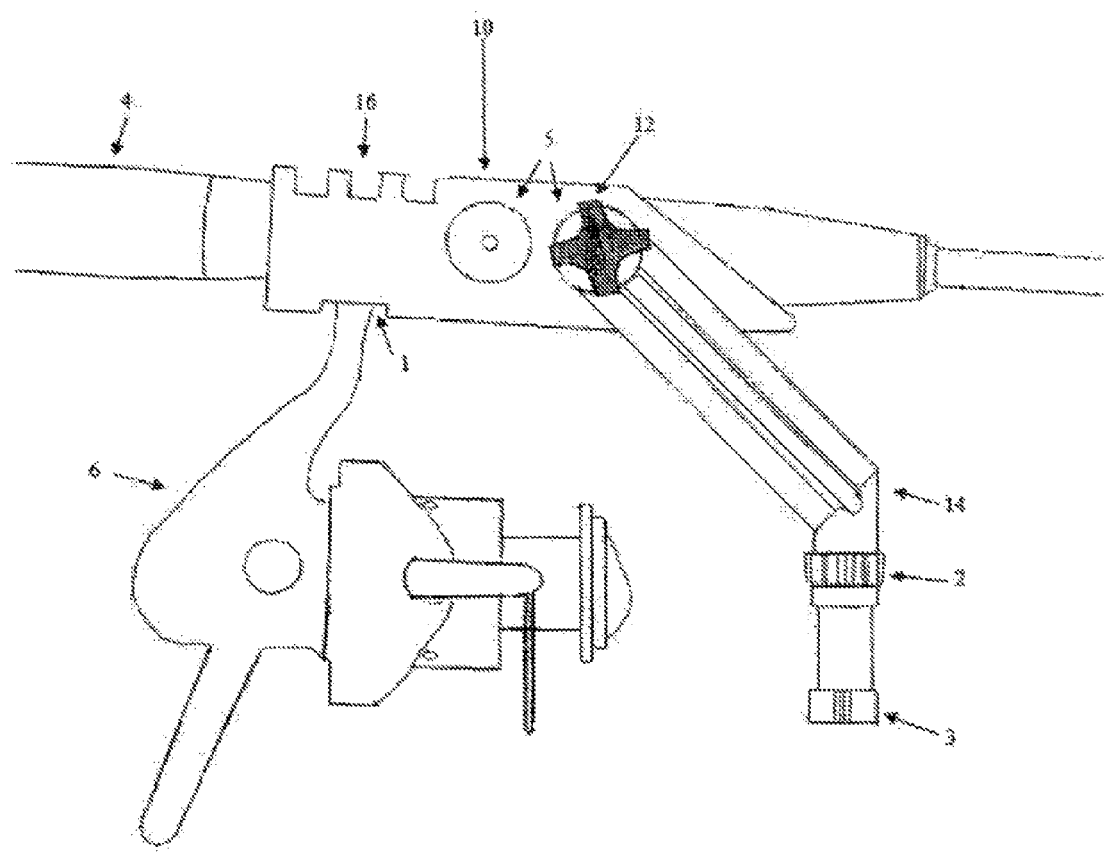
FIG. 6 is a side view of one embodiment of the fishing rod holder device, and an exemplary fishing rod when the fishing rod holder device is used on a dock, the ground, or for ice fishing.
Figure 7:
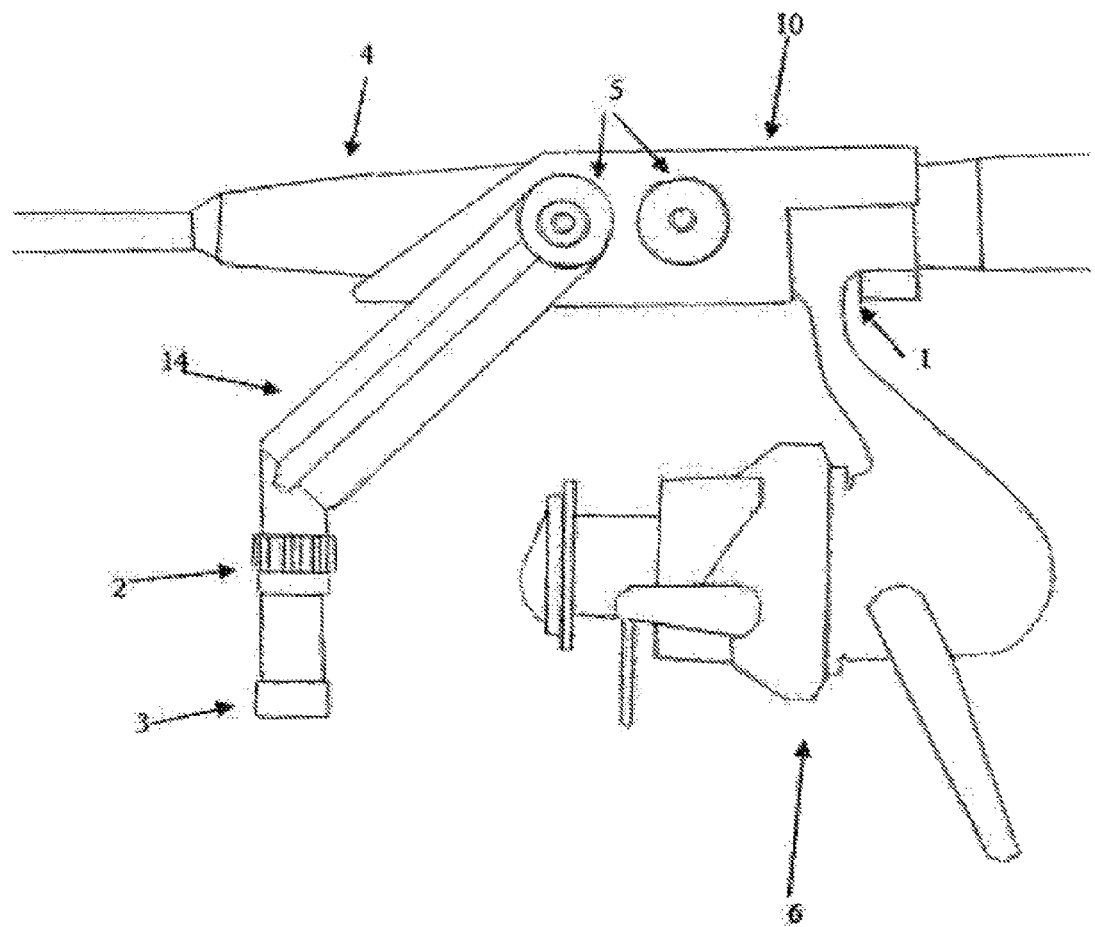
FIG. 7 is an isometric view of one embodiment of the fishing rod holder device with an exemplary fishing rod when the device is used in fixed position setting.

When the angler chooses to use the fixed position (see, e.g., FIG. 1) he or she will place the fasteners and locking knob in front hole 13 (not shown in FIG. 1, obscured by locking knob 12). Once in place, the angler rotates the locking knob 12 clockwise until it becomes tightened. This will fix the rod holder 11 which keeps the entire rod holder system 10 static. Said angler then places their fishing rod/reel into the back of the rod holder 10 and rotates counterclockwise until the system is as depicted in FIG. 6. The rod holder 11 does not allow for the rod holder to slide forward which restricts the fishing rod from being pulled out the front of the rod holder 10. To increase variability, the locking knob 12 can be tightened to any degree of angle which said angler chooses. This allows for the angler to easily change fishing styles whether it is jigging, trolling, or any other style of fishing.

When the angler chooses to use the continuous pivoting position he or she will ensure the fasteners and locking knob 12 remain in front hole 13 and rotate the locking knob 12 counter clockwise so it is no longer tightened. The locking knob 12 will be loosened so the rod holder 11 can freely rotate. Once again the angler will insert the rod/reel in the rear of rod holder 11; in the same manner as in the "fixed position" FIG. 7.

In order for the continuous pivoting position to function properly the angler adds weight to the line until the rod/reel balances on the yoke 14 and the pole is parallel with the water similar to FIG. 6.

FIGS. 2A-2D and 3A-3D depict the effects of a wave pushing the boat 7 upwards and downwards respectively.

(a) and (b) shows how the fishing rod holder 10 works in continuous pivoting position, while (c) and (d) shows how the fishing rod holder 10 works in fixed position. As the wave pushes the boat 7 up in (c), the fishing rod 4 goes up with the boat. This causes the bait 8 to go up as well. As the waves increase and decrease in height, the bait depth constantly changes. Thus, the rod holder 10 does not remain static. As depicted in (a) when the wave pushes the boat up the rod holder 10 pivots and keeps the bait 8 in the same place. Moreover, when the boat rocks back down in (d) due to the wave, the standard fixed positioned rod holder 4 goes up down with the boat 7 and the bait height is decreased and sometimes will hit bottom. On the contrary, in (b), the rod holder 10 now pivots about the yoke and keeps the bait at the same height. When using the continuously pivoting design in order to optimize the fish caught the angler will not remove the rod prior to setting the hook. The angler will simply push down on the handle of the fishing rod. This action will cause the rod holder 10 to pivot about the yoke and will set the hook without having to remove the rod. Once the hook is set the angler will remove the rod out the back of the holder which will keep both the rod/reel and angler in the watercraft at all times.

Figure 4:
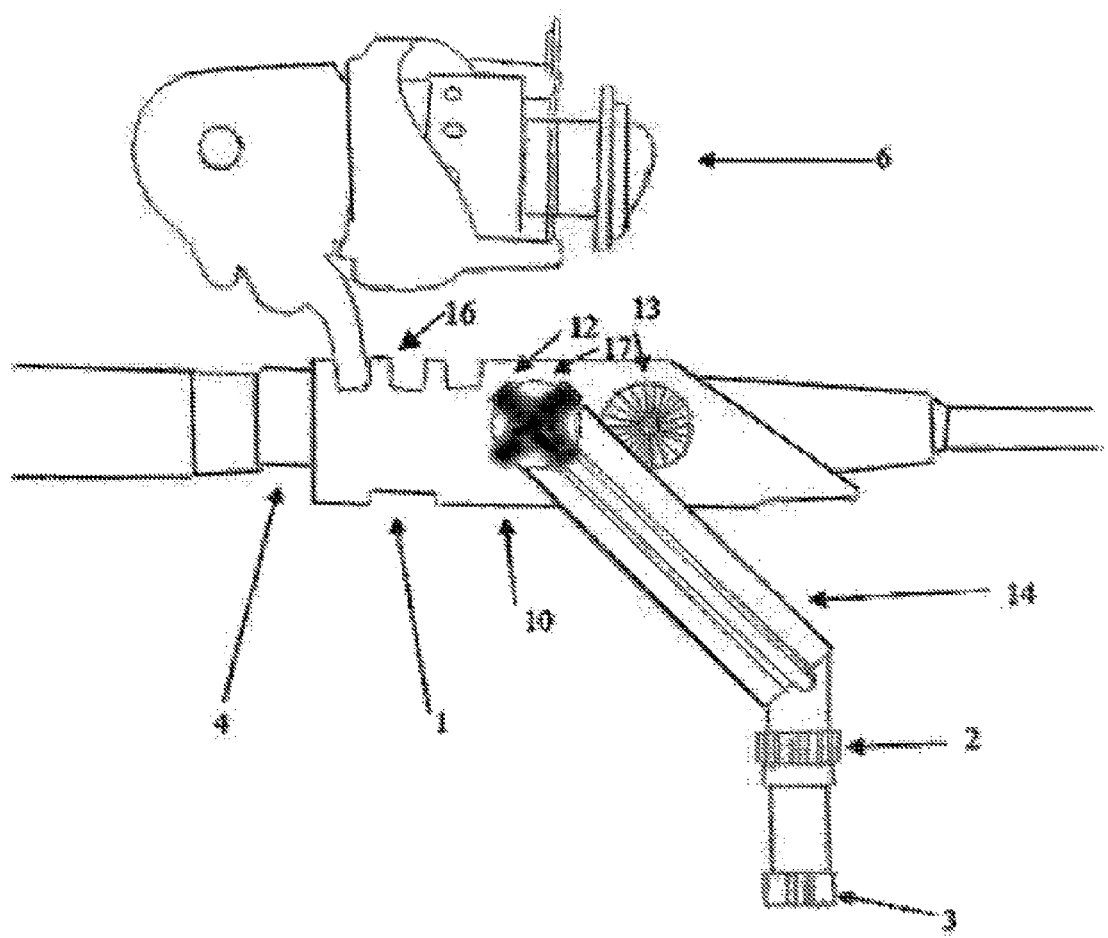
FIG. 4 is a side view of one embodiment of the fishing rod holder device, and an exemplary fishing rod when the fishing rod holder device is used in the self-pivoting position setting.
Figure 5:
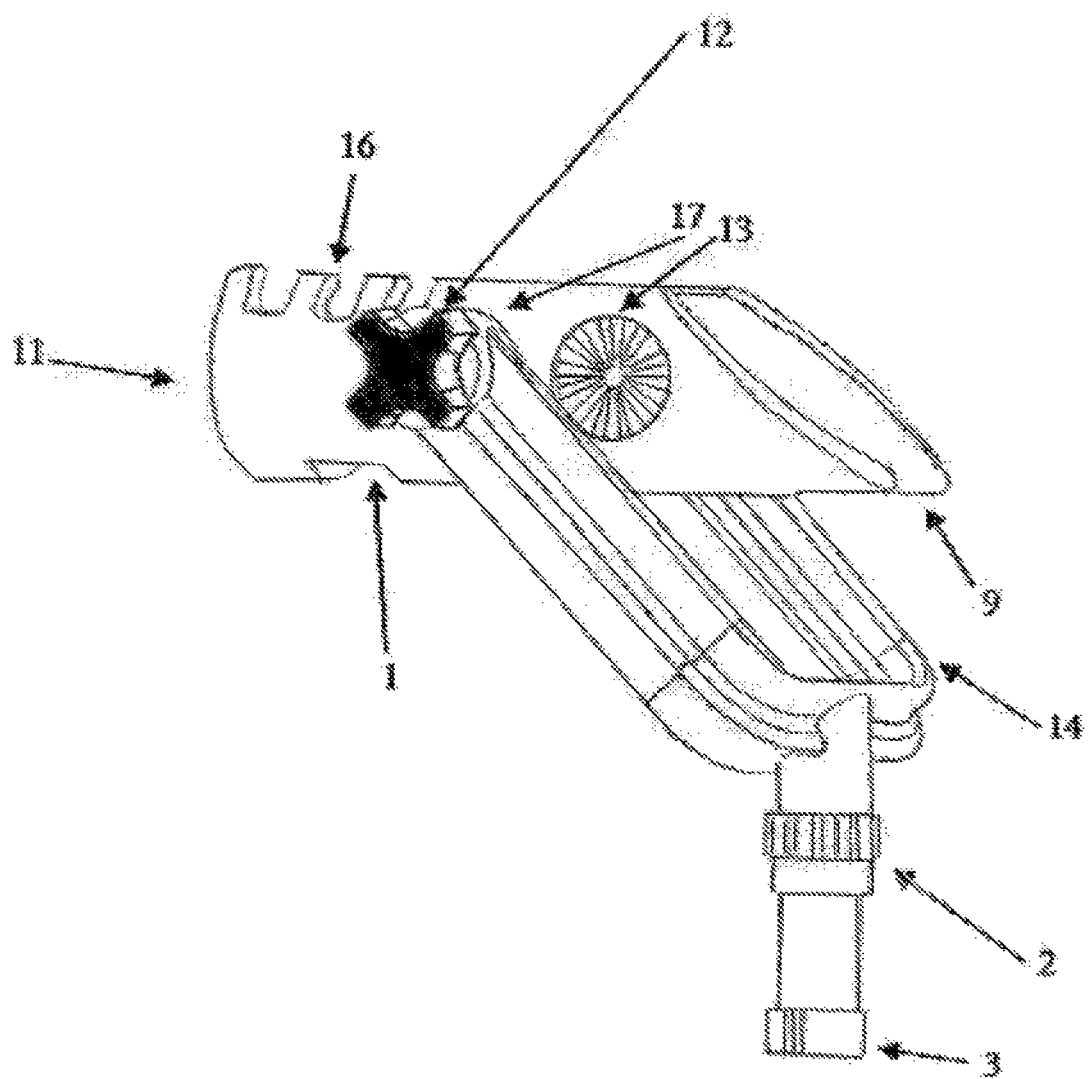
FIG. 5 is a side view of one embodiment of the fishing rod holder device, and an exemplary fishing rod when the fishing rod holder device is used in the self-pivoting position setting.

FIG. 4 shows the rod holder 10 used as an ice fishing holder. When the angler uses the rod holder 10 in this position he or she will un-fix the rod holder 10 from the watercraft and place the rod holder 10 in an alternative base 15 or base 18. Said base can be a watercraft base 15 which is fixed to an article (e.g., bucket, sled, trailer, ice shack, etc) or base 18. The angler will then relocate locking knob 12 and fasteners to rear pivot hole 17. Said angler will also rotate the locking knob 12 so it is not tightened. Once loosened, the angler can now insert their rod or reel into the rear of the rod holder 10 as shown in FIG. 4. In order for zero line resistance position to function properly the angler adds weight to the line until the rod/reel balances on the yoke 14 and the pole is parallel with the ice. Furthermore, the multiple notches 16 are to accommodate various reel and rod weights and types. Furthermore, both standard length fishing rods and ice fishing rods (which are typically shorter) can be used in this configuration.

Figure 8:
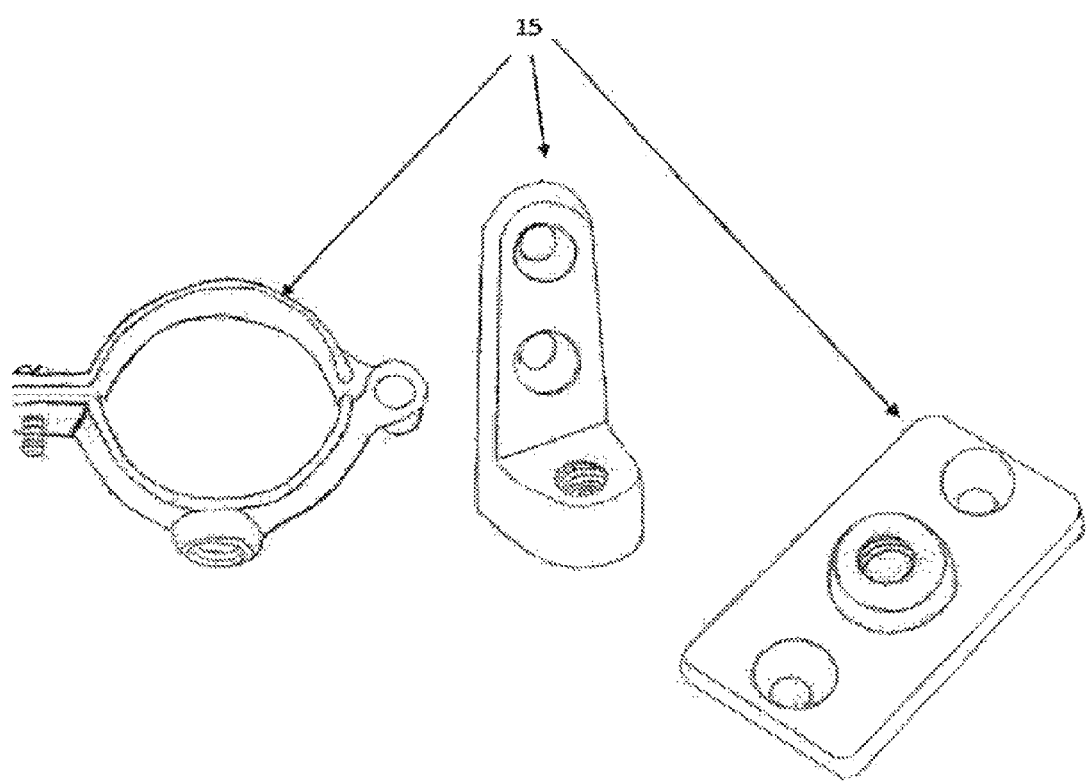
FIG. 8 is an isometric view of exemplary bases which can be used to secure the fishing rod holder device to a vessel.

FIG. 8 shows some exemplary bases the fishing rod holder may be attached to.

Figure 9:
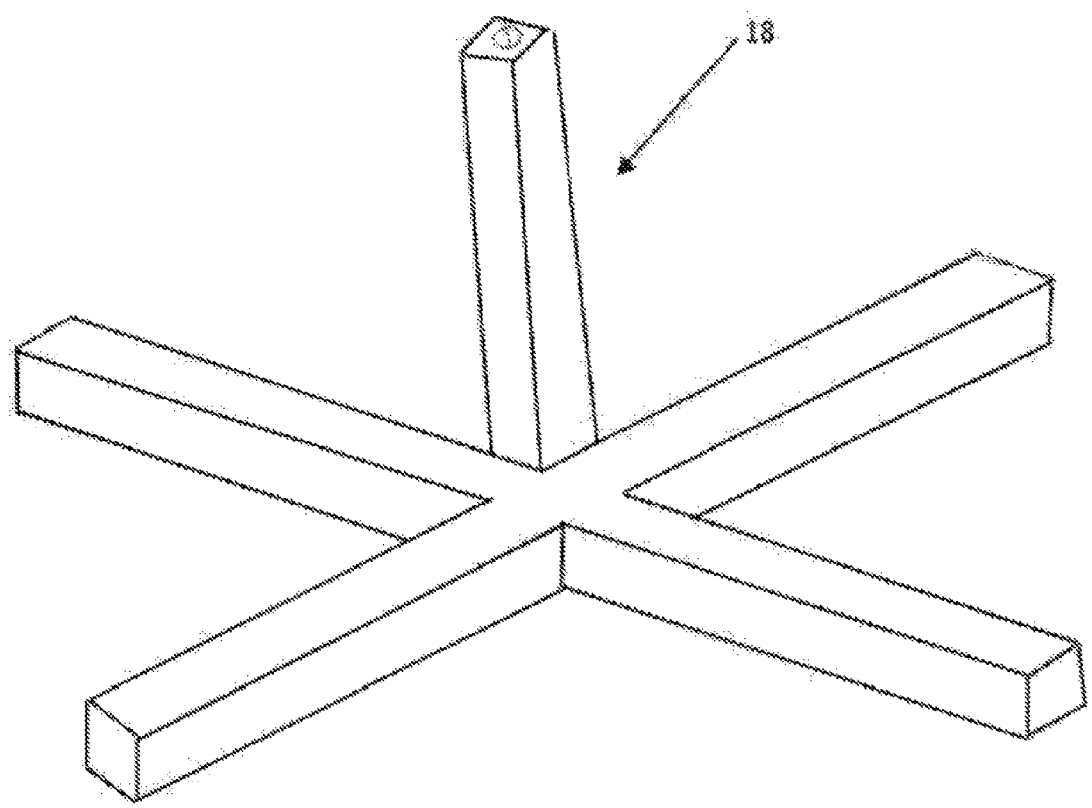
FIG. 9 is an exemplary base which can be used to secure the fishing rod holder device to the ground.

FIG. 9 shows another base which can be used to secure the fishing rod holder to the ground.

In the preferred embodiment, the bases shown in FIGS. 8 and 9 are attached to the fishing rod holder using a standard square-headed screw. The head of the screw is inserted into the base 3 of the stem of the fishing rod holder until snug. The threads of the screw can be threaded into the screw hole in the base, as shown in FIGS. 8 and 9. Additionally, the toothed ring 2, encircling the stem of the fishing rod holder, shown in FIGS. 1 and 4-7 allows the fishing rod holder to be inserted into a compatible base with the female component of the toothed ring. This allows for easy positioning of the fishing rod holder at multiple angles relative to the side of the boat. In the preferred embodiment, the toothed ring may be changed in order to be compatible with a specific base on the market. In another embodiment, the toothed ring is permanently secured to the stem, and may be manufactured together as one piece.

As various changes could be made in the above constructions without departing from the scope of the disclosure, it is intended that all matter contained in the above description or shown in the accompanying drawings shall be interpreted as illustrative and not in a limiting sense.

It should be understood that various terms referring to orientation and position are used throughout this document—e.g., "rear," "front," "rotate," or "counterclockwise"—and that such terms are relative rather than absolute. Such terms should be regarded as words of convenience, rather than limiting terms.

The description set out above is merely of exemplary versions of the invention, and it is contemplated that numerous additions and modifications can be made, apart from combining the different features of the foregoing versions in varying ways, adjusting relative dimensions, and using different materials. The true scope of the invention will be defined by the claims included in any later-filed utility patent application claiming priority from this provisional patent application.

I claim:

1. A fishing pole holder, comprising:
    a tubular rod holder having a length extending between a front end defining a frontmost boundary of the tubular rod holder and a rear end, the tubular rod holder further having a lowermost boundary and an uppermost boundary, the tubular rod holder further including a first side and a second side, the first side and the second side each including a first pivot hole spaced along the length of the tubular rod holder from a second pivot hole, the tubular rod holder having at least one notch formed along the uppermost boundary proximate the rear end and a cutout proximate said rear end beginning at the rear end and terminating proximate the lowermost boundary, the at least one notch and the cutout configured to receive a portion of a reel; and
    a support member having a first arm connected to one of the pivot holes on the first side of the tubular rod holder and a second arm connected to one of the pivot holes on the second side of the tubular rod holder, the first and second arms being joined by a cross support, the cross support being connected to a base portion, the base portion being at an oblique angle relative to the first and second arms,
    wherein the support member is pivotally connected to aligned pivot holes on opposite sides of the rod holder.

2. The fishing pole holder of claim 1, wherein the tubular rod holder includes a plurality of notches having different sizes.

3. The fishing pole holder of claim 1, wherein at least one of the pivot holes on each of the first and second sides of the tubular rod holder include a plurality of ridges positioned to surround the pivot hole.

4. The fishing pole holder of claim 1, wherein the support member further comprises a locking knob, wherein the locking knob rotates to secure one of the first and second arms to one of the pivot holes.

5. The fishing pole holder of claim 4, wherein the locking knob allows the tubular rod holder to pivot when the locking knob is loosened.

6. A fishing pole holder, comprising:
    a tubular rod holder having a length extending between a front end and a rear end, the tubular rod holder further having a lowermost boundary and an uppermost boundary, the tubular rod holder further including a first side and a second side, the first side and the second side each including a first pivot hole spaced along the length of the tubular rod holder from a second pivot hole, the tubular rod holder having at least one notch formed along the uppermost boundary proximate the rear end and a cutout proximate said rear end beginning at the rear end and terminating proximate the lowermost boundary, the notches and the cutout configured to receive a portion of a reel;
    a support member having a first arm pivotally connected to one of the pivot holes on the first side of the tubular rod holder and a second pivotally arm connected to one of the pivot holes on the second side of the tubular rod holder to define a pivot axis, the first and second arms being joined by a cross support; and
    a base portion extending along a base axis that is perpendicular to the pivot axis, the base axis being at an oblique angle relative to the first and second arms such that the pivot axis is spaced from the base axis.

7. The fishing pole holder of claim 6, wherein the tubular rod holder includes a plurality of notches formed near a first end of the tubular rod holder.

8. The fishing pole holder of claim 6, wherein the support member further comprises at least one locking knob, wherein the locking knob rotates to secure one of the first and second arms to one of the pivot holes on the tubular support member.

9. The fishing pole holder of claim 8, wherein the locking knob allows the rod holder to pivot along the pivot axis when the locking knob is loosened.

10. The fishing rod holder of claim 6 wherein the support member further comprises a yoke, the yoke having an end which connects to the base.

\* \* \* \* \*

UNITED STATES PATENT AND TRADEMARK OFFICE
CERTIFICATE OF CORRECTION

PATENT NO. : 9,675,057 B2  
APPLICATION NO. : 14/143393  
DATED : June 13, 2017  
INVENTOR(S) : Justin Vannieuwenhoven Page 1 of 1

It is certified that error appears in the above-identified patent and that said Letters Patent is hereby corrected as shown below:

In the Specification

| | | |
|---|---|---|
| In Column 1, | Line 32, | change "fish" to --fishing--. |
| In Column 2, | Line 29, | change "fasters" to --fasteners--; |
| | Line 63, | delete "out of water". |

Signed and Sealed this  
Twenty-second Day of August, 2017

Joseph Matal  
*Performing the Functions and Duties of the*  
*Under Secretary of Commerce for Intellectual Property and*  
*Director of the United States Patent and Trademark Office*